Figure 1:
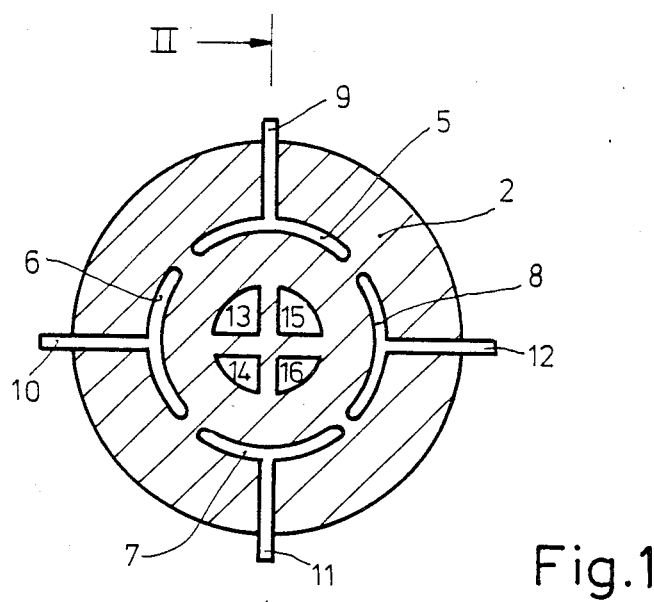

United States Patent [19]

Martens

[11] Patent Number: 4,612,810

[45] Date of Patent: Sep. 23, 1986

[54] OPTICAL PRESSURE SENSOR

[75] Inventor: Gerhard Martens, Ellerau, Fed. Rep. of Germany

[73] Assignee: U.S. Philips Corporation, Tarrytown, N.Y.

[21] Appl. No.: 700,377

[22] Filed: Feb. 11, 1985

[30] Foreign Application Priority Data

Feb. 13, 1984 [DE] Fed. Rep. of Germany ....... 3405026

[51] Int. Cl.⁴ ............................................... G01L 9/00
[52] U.S. Cl. .................................. 73/705; 250/231 P; 250/225
[58] Field of Search .............. 73/705; 250/231 P, 225, 250/231 R

[56] References Cited

FOREIGN PATENT DOCUMENTS 0211523 12/1982 Japan ..................................... 73/705

Primary Examiner—Donald O. Woodiel
Attorney, Agent, or Firm—Bernard Franzblau; Robert T. Mayer

[57] ABSTRACT

An optical pressure sensor (1) is used for determining pressures and differential pressures of explosive liquids and gases and comprises a translucent body (2), having pressure measurement chambers (5, 7) formed as continuous holes. Sealing plates (3, 4), seal the pressure measurement chambers from the outside environment. The liquid or gaseous medium, introduced through inlet openings (9, 11) into the pressure measurement chambers and subjected to pressure, produces internal stresses in the body (2) so that the condition of polarization of polarized light (17), by which the body is irradiated, varies with the pressure in the pressure measurement chambers. An analyzer (18) filters from the light having a pressure-dependent condition of polarization linearly polarized light, whose intensity varies with the pressure of the medium to be determined. The pressure sensor is constructed in a simple manner and reacts with a high degree of sensitivity and accuracy to pressures and differential pressures. By adjustment of the diameter of the pressure measurement chambers and their relative distance, the sensitivity of the pressure sensor can be varied within wide limits.

18 Claims, 3 Drawing Figures

U.S. Patent    Sep. 23, 1986    4,612,810

OPTICAL PRESSURE SENSOR

The invention relates to an optical pressure sensor comprising a light transmissive body which is in communication with a pressure measurement chamber having an inlet opening for a liquid or gaseous medium subjected to pressure and which is irradiated by polarized light. An analyser is arranged in the direction of irradiation of the light and behind the body and which filters from the light having a pressure-dependent polarization condition linearly polarized light having an intensity which varies with the pressure in the pressure measurement chamber.

Optical pressure sensors are used for determining pressures and differential pressures of explosive liquids and gases because optical pressure sensors are connected solely through optical conductors to the evaluation circuit and are thus free from electrical voltages, which could give rise to dangerous spark formation.

U.S. Pat. No. 4,368,645 discloses an optical pressure sensor comprising a block-shaped translucent body which is irradiated by polarized light and which is acted upon by the pressure to be determined. If the pressure of a liquid or gaseous medium is to be determined, it is required to introduce the gas or the liquid into a pair of bellows which press on the translucent body with a force corresponding to the pressure of the medium. As a result, the polarization condition of the light irradiating the body is varied so that an analyser arranged in the direction of irradiation of the light behind the body filters from the light having a pressure-dependent condition of polarization linearly polarized light having an intensity corresponding to the value of the liquid or gas pressure. The pair of bellows and the translucent body are arranged in a chamber which serves to hold the pair of bellows and the translucent body.

In order to produce in the translucent body a defined and homogeneous stress distribution, the pair of bellows must be provided with a flat bottom and must be constructed so that the liquid or gas pressure is directed along an axis at right angles to the surface of the holding chamber in order that the pair of bellows act in the direction of the major stress axis upon the translucent body. During the manufacture, and more particularly during the adjustment of the known sensor, a very high degree of accuracy is therefore required so that the sensor operates perfectly and reaches the sensitivity required for measuring the liquid pressure.

The invention has for an object to provide a simply constructed pressure sensor which accurately determines the pressure of a gas or of a liquid and whose sensitivity is variable within wide limits.

According to the invention, this object is achieved in a pressure sensor of the kind mentioned in the opening paragraph in that the pressure measurement chamber is in the form of a cavity inside a light transmissive body.

The internal stresses in the light transmissive (e.g. translucent) body then vary with the pressure of the liquid or gaseous medium introduced into the pressure measurement chamber. By means of an analysis of the condition of polarization, which can be varied even by very small internal stresses of the polarized light irradiating the body, the liquid or gas pressure can be accurately determined. Moreover, the sensitivity of the pressure sensor can be varied within wide limits by a variation of the diameter and the shape of the pressure measurement chamber.

In order to be able to measure the difference between two different gas or liquid pressures, it is advantageous that the body has four pressure measurement chambers uniformly distributed along its circumference and arranged pairwise opposite each other and each having an inlet opening, different pressures being applied to the two pairs of pressure measurement chambers.

When the four pressure measurement chambers are in the form of slots sealed from the outside, which are arranged pairwise opposite each other with their longitudinal walls, the surface over which the gas or the liquid presses on the area of the body irradiated by the light is very large. As a result, the pressure sensor reacts very sensitively on gas or liquid pressures and can perfectly measure especially small pressure differences with a high component of constant pressure. Slot-shaped pressure measurement chambers, which are of straight form, can be milled in a very simple manner out of the translucent body.

In order to determine very high pressures, the four pressure measurement chambers can be in the form of circular bores located on a common radius and sealed from the outside.

The manufacture of the pressure sensor is simplified when the pressure measurement chambers are formed as continuous holes in the body, on which sealing plates are arranged on both sides of the body at the area of the pressure measurement chambers.

A pressure sensor that can be manufactured in a simple manner is obtained when the sealing plates consist of metal and are joined to each other by screws. The condition of polarization of the light is not influenced by internal stresses of the body produced by the sealing plates because the internal stresses are parallel to the direction of the light.

In an advantageous embodiment of the invention, the translucent body comprises a circular disk and the sealing plates have an annular shape. Such pressure sensors are of compact construction and can be manufactured in a simple manner.

In a further embodiment of the invention, the body has additional recesses between the pressure measurement chambers. As a result, the internal stresses are concentrated on the area of the translucent body irradiated by the light so that the sensitivity of the pressure sensor is increased.

Figure 2:
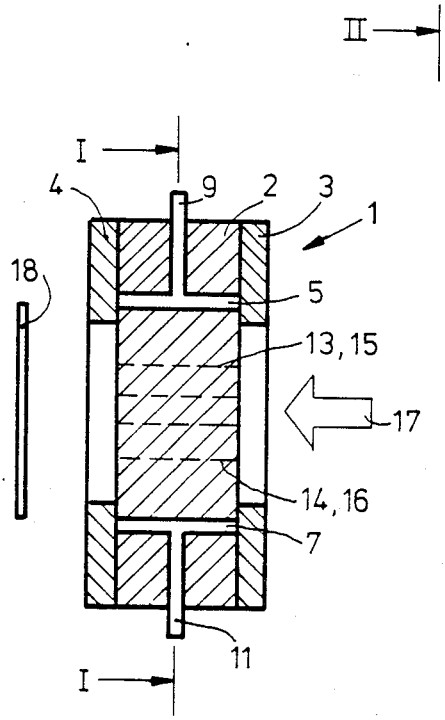
Figure 3:
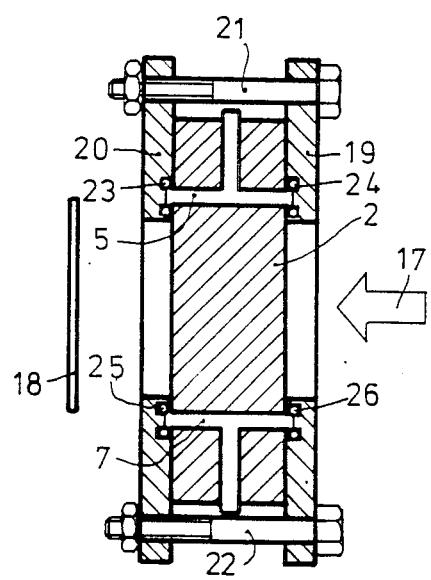

In order that the invention may be readily carried out, it will now be described more fully, by way of example, with reference to the accompanying drawings, in which:

FIG. 1 shows a cross-section of the translucent body taken on the line I—I in FIG. 2, FIG. 2 is a longitudinal sectional view of the optical pressure sensor taken on the line II—II of FIG. 1, and FIG. 3 shows an optical pressure sensor with sealing plates.

The light transmissive (e.g. translucent) body 2 shown in sectional view in FIG. 1 comprises four pressure measurement chambers 5 to 8 in the form of slots having the shape of a segment of a circle. The walls of oppositely arranged slots 6, 8 and 5, 7 can be flat and can be arranged parallel to each other.

As shown in FIG. 2, the slots in the form of continuous holes are sealed from the outside by two sealing plates 3 and 4 arranged on the two end sides of the body 2. The sealing plates 3 and 4 may consist of the same material as the translucent body 2. They are glued, for example, to the end sides of the body 2.

Each pressure measurement chamber 5 to 8 is provided with an individual inlet opening 9 to 12. Through these inlet openings 9 to 12, a liquid or gaseous medium subjected to pressure is supplied to the pressure measurement chambers 5 to 8. The pressure measurement chambers 5 to 8 are uniformly distributed along the circumference of the body 2 and are arranged on a common radius. The body 2 may be provided, depending upon its use, with less than four pressure measurement chambers, for example with only one pressure measurement chamber, or also with more than four pressure measurement chambers.

The translucent body 2 is in the form of a circular disk and consists of quartz glass, glass ceramic material or titanium silicate glass. It may take any other form, for example the form of a cube or of a square. When the body 2 has a diameter of 6 cm and a thickness of 3 cm, the pressure sensor 1 has a measuring range of about 1 to 10 bar without the additional recesses 13 to 16 to be described below.

The pressure measurement chambers 5 to 8 may also be in the form of continuous circular bores having a diameter of, for example, 1 to 3 mm. In this case, the measuring range of the pressure sensor is about 10 to 500 bar. The measuring range of the pressure sensor can then be varied within wide limits by means of the bore diameter and the relative distance of the bores.

The sensitivity of the pressure sensor can be increased further by additional recesses 13 to 16 formed between the pressure measurement chambers 5 to 8. The recesses 13 to 16 may be, as shown in FIGS. 1 and 2, in the form of continuous holes. If the distance between the outer walls of the recesses 13 and 16 and 14 and 15, respectively, is about 25 mm, body sections in the form of a cross having a width of a few millimeters are formed between them, on which the internal stresses in the body 2 are concentrated. As a result, a measuring range of about 10 millibar to 1 bar can be attained.

When linearly or elliptically polarized light 17 irradiates the body 2, an analyser 18, constructed as a polarizer, filters from the light 17 linearly polarized light whose intensity is a measure of the pressure of the medium to be measured.

If gases at different pressures are introduced into the respective pressure measurement chambers 5, 7 and 6, 8, there are produced at the area of the body 2 located between the pressure measurement chambers 5 to 8 internal stresses which vary with the difference in the gas pressures. These internal stresses change the condition of polarization of the light 17 in a manner such that the intensity of the light filtered by the analyser 18 is also varied. This light intensity is measured and, via an evaluation circuit, provides information about the difference in the gas pressures.

The annular sealing plates 19 and 20 of the pressure sensor shown in FIG. 3 consists of metal and are joined to each other by means of screw bolts 21 and 22. There are arranged between the body 2 and the sealing plates 19 and 20 sealing rings 23 to 26, which seal the pressure measurement chambers 5 to 8 from the outside.

The internal stresses produced by the sealing plates 19 and 20 in the body 2 are parallel to the direction 17 of the light irradiating the body 2 and consequently do not influence the measurement result.

What is claimed is:

1. An optical pressure sensor comprising, a light transmissive body, in communication with a pressure measurement chamber having an inlet opening for a liquid or gaseous medium subjected to pressure, said body being irradiated by polarized light, an analyser arranged in the direction of the light irradiation and behind the body and which filters from the light having a pressure-dependent condition of polarization linearly polarized light having an intensity which varies with the pressure in the pressure measurement chamber, characterized in that the pressure measurement chamber comprises a cavity inside the light transmissive body.

2. An optical pressure sensor as claimed in claim 1 wherein the body comprises a circular disk and the pressure measurement chambers comprise continuous holes in the disk, and further comprising annular shaped sealing plates arranged on both sides of the disk in the vicinity of the pressure measurement chambers.

3. An optical pressure sensor as claimed in claim 1, characterized in that the body comprises four pressure measurement chambers uniformly distributed along its circumference and arranged pairwise opposite each other with each chamber having an inlet opening, different pressures being applied to the two pairs of pressure measurement chambers.

4. An optical pressure sensor as claimed in claim 3, characterized in that the body comprises additional recesses between the pressure measurement chambers.

5. An optical pressure sensor as claimed in claim 3, characterized in that the four pressure measurement chambers comprise slots which are sealed from the outside and are pairwise arranged opposite each other with their longitudinal walls.

6. An optical pressure sensor as claimed in claim 5 wherein the body comprises additional recesses between the pressure measurement chambers.

7. An optical pressure sensor as claimed in claim 2, characterized in that the chamber slots each have the shape of a segment of a circle and are located on a common radius.

8. An optical pressure sensor as claimed in claim 7 wherein the body comprises additional recesses between the pressure measurement chambers.

9. An optical pressure sensor as claimed in claim 3 wherein the pressure measurement chambers comprise continuous holes in the body, and further comprising sealing plates arranged on both sides of the body in the vicinity of the pressure measurement chambers.

10. An optical pressure sensor as claimed in claim 9 wherein the sealing plates are made of metal and are joined together by means of screws.

11. An optical pressure sensor as claimed in claim 9 wherein the body comprises a circular disk and the sealing plates have an annular shape.

12. An optical pressure sensor as claimed in claim 1, characterized in that the pressure measurement chambers comprise continuous holes in the body on which sealing plates are arranged on both sides of the body in the area of the pressure measurement chambers.

13. An optical pressure sensor as claimed in claim 12, characterized in that the sealing plates are made of metal and are joined to each other by means of screws.

14. An optical pressure sensor as claimed in claim 12, characterized in that the body comprises a circular disk and the sealing plates are of annular shape.

15. An optical pressure sensor as claimed in claim 12 wherein the body comprises additional recesses between the pressure measurement chambers.

16. An optical pressure sensor comprising, a light transmissive body responsive to pressure to vary the polarization condition of a polarized light beam passing through said body, at least one cavity within said body forming a pressure measurement chamber having an inlet opening to receive a liquid of gaseous medium subject to pressure, a beam of polarized light for irradiating said body, and a light analyzer arranged behind the body in the path of said beam of irradiating light after it passes through the body, the beam of light after passage through the body having a pressure dependent condition of polarization, said analyzer filtering from the pressure dependent polarized light linearly polarized light whose intensity varies with the pressure of a liquid or gaseous medium in the pressure measurement chamber.

17. An optical pressure sensor as claimed in claim 16 wherein the body includes at least a pair of diametrically opposed pressure chambers each with an inlet opening, said chambers comprising slots in the shape of a segment of a circle.

18. An optical pressure sensor as claimed in claim 17 comprising one or more additional recesses in said body that are located between the pressure measurement chambers.

* * * * *